United States Patent [19]

Almagor

[11] 4,439,103

[45] Mar. 27, 1984

[54] AUTOMATIC EJECTOR SYSTEM

[75] Inventor: Daniel Almagor, Setauket, N.Y.

[73] Assignee: The Peelle Company, Bay Shore, N.Y.

[21] Appl. No.: 316,309

[22] Filed: Oct. 29, 1981

[51] Int. Cl.[3] .............................................. B65G 65/00

[52] U.S. Cl. ...................................... 414/661; 104/162

[58] Field of Search ............... 414/259, 260, 280, 661; 104/162, 176

[56] References Cited

U.S. PATENT DOCUMENTS

| | | | |
|---|---|---|---|
| 3,337,070 | 8/1967 | Guilbert | 414/667 |
| 3,353,692 | 11/1967 | Ludwig | 104/162 X |
| 4,099,707 | 1/1978 | Anderson | 104/162 X |

*Primary Examiner*—Robert G. Sheridan
*Attorney, Agent, or Firm*—Pearne, Gordon, Sessions, McCoy, Granger & Tilberry

[57] ABSTRACT

Apparatus for automatically handling a material unit in an elevator system. The disclosed apparatus ejects a wheeled cart from an elevator car by engaging a face of the cart with a pusher arm suspended from a carriage which traverses a track mounted at the top of the elevator car. The carriage and pusher arm are capable of ejecting the cart clear of the car from either end of the car.

13 Claims, 10 Drawing Figures

AUTOMATIC EJECTOR SYSTEM

BACKGROUND OF THE INVENTION

The invention relates to improvements in material handling, and particularly to apparatus for automatically handling material units loaded and unloaded on lift elevators.

PRIOR ART

For the most part, prior art automatic loader and unloader apparatus have characteristically been highly integrated with the host elevator car and with the cart of like unit carried on the elevator car. Special tracks and coupling devices on the elevator car and cart unit have ordinarily been required by such prior art apparatus. Commonly, the tracks and coupling devices associated with a car have been provided on the floor of the car. Typically, the tracks and coupling apparatus are difficult to clean and sanitize. Where such track and coupling apparatus are located on the floor of a car, they tend to accumulate soil and debris, making it especially difficult to maintain cleanliness and sterility.

The special floor mounting requirements and subfloor space required by prior art devices often make them impractical for retrofitting applications. Similarly, cart units of existing systems can require such extensive reworking as to make their use in a retrofitting application impractical. Certain prior art floor-mounted track and coupling apparatus in the event of a power shortage or equipment failure can immobilize a cart unit on the elevator car, particularly where the cart is coupled to the handling apparatus beneath the cart unit and the cart unit obstructs access for manual intervention with the coupling apparatus.

SUMMARY OF THE INVENTION

The invention provides material handling apparatus for an elevator car which is suspended on the car above the space occupied by a material unit. The handling apparatus includes a retractable arm which depends from a carriage suspended above the material unit-occupied space. The arm engages an end face of the material unit to propel it between the car and landing.

As disclosed, the handler arm operates on a plain end face of a material unit so that special coupler elements or other provision on the material unit are avoided, Moreover, the disclosed handler apparatus avoids coupler aligning tracks and power elements on or below the elevator car floor.

With the handler apparatus suspended above the cart space, it is less likely to become fouled or contaminated with airborne material or material transported on the elevator car. Because the elevator car floor is uninterrupted and unobstructed by material unit guiding and coupling elements, it is readily cleaned and sterilized. Articles or materials which are dislodged from the material unit cannot become jammed or temporarily lost on the car, as would otherwise occur where the plane of the floor is interrupted with provisions for the handler apparatus. In the event of a power failure or equipment breakdown, the disclosed apparatus is readily overridden by direct manual manipulation of the material unit and/or the handler apparatus.

In the disclosed embodiment of the invention, the handler arm is suspended on a carriage unit which traverses a glide plate unit, which in turn traverses the length of the elevator car. The arm idles in a retracted position centered above the car space that receives a material unit such as a wheeled cart. When utilized to automatically eject the cart, the carriage and glide plate units first transport the arm from the idle position to the end of the cart opposite the car gate or door through which the cart is to be ejected. Subsequently, the arm is lowered in a vertical plane between this opposite end of the cart and the adjacent wall of the elevator car. Thereafter, the carriage and glide plate units forcibly displace the cart towards the distant car gate, whereupon the arm contacts and propels the cart from the elevator car. The glide plate and carriage units are adapted to provide cantilevered support of the handler arm well beyond the elevator car to ensure that the cart is fully ejected.

DESCRIPTION OF THE PREFERRED EMBODIMENT

Figure 1A:
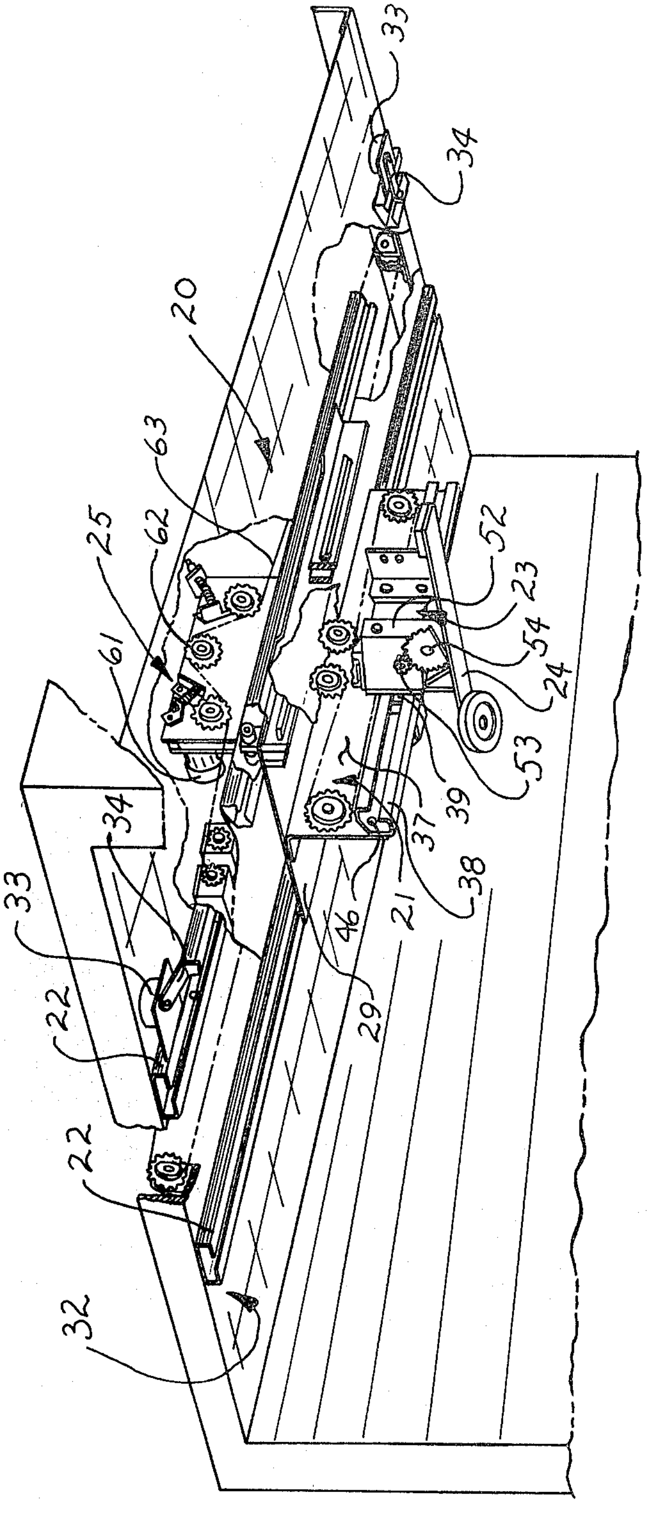
FIG. 1*a* is a perspective partial view of an elevator car incorporating handler apparatus embodying the invention.
Figure 1B:
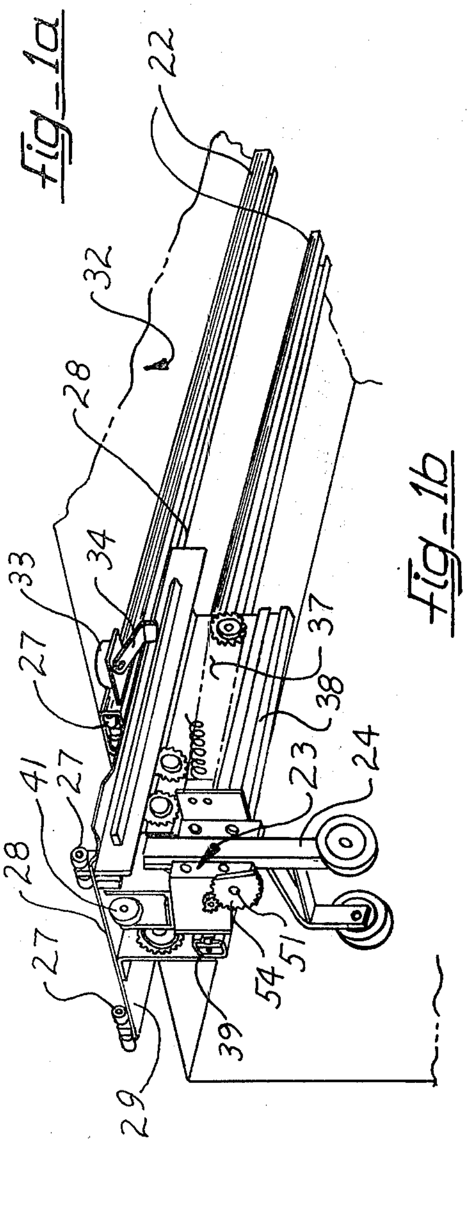
FIG. 1*b* is a view similar to FIG. 1*a*, but showing the handler apparatus in an extended, off-loading condition.

Referring now to the drawings, and particularly to FIG, 2, there is shown a material lift elevator system such as is employed in a hospital, hotel, or like structure, where it is necessary to convey material from one floor to another. For purposes of illustration in FIG. 2, there are shown three floors or landings 11*a* through 11*c*. An elevator car, shown somewhat schematically at 12, is vertically hoisted from one floor 11 to another in shaft 13. At each floor or landing 11, there is shown at least one hatchway door or gate 14, in the illustrated case, an overhead single paneltype. At each end of the car 12 are doors 17 which align with the gate or gates of the particular landing at which the car is stopped.

On the elevator car 12 is a wheeled cart 16 which is representative of typical material units which are carried on the car and loaded and unloaded betweeen landings 11. Other units besides the wheeled cart 16, such as a dolly, tote box, pallet, or self-supported matarial unit, can be handled on the elevator car. Where the material unit being handled is not provided with wheels, the floor of the elevator car 12 and the floor area of the landing 11 adjacent the hatchway door 14 can be provided with roller bed surfaces known in the art.

Apparatus to automatically unload or otherwise handle the cart unit 16 is illustrated generally at 20. The handler apparatus 20 is mounted on overhead structure on the car 12 so that it is suspended above the space occupied by the cart 16. With particular reference to FIGS. 1*a*, 1*b*, 3 and 4, the principal parts of the handler apparatus are a glide plate assembly 21 which traverses tracks 22, a carriage assembly 23 which traverses the glide plate 21 and which includes a retractable operator arm 24, and a drive unit 25 for motively displacing the glide plate 21 and carriage 23 on their respective tracks.

The glide plate 21 is a T-shaped structure fabricated of sheet steel. Sets of rollers 27, six in the illustrated case, are provided at opposite ends 28 and at the center of a top plate element 29 of the glide plate assembly 21. The rollers 27 are confined to movement in a straight path by the associated tracks 22 which are C-shaped and which extend in a longitudinal direction perpendicular to the opposite car doors 17. The tracks 22 are fixed to the underside of a top panel 32 of the elevator car 12. Adjacent opposite ends of one of the tracks 22 are rotary solenoids 33, which have stop arms 34 on their respective operating shafts. When either one of the solenoids 33 is electrically energized, its associated arm 34 is rotated into the path of a stop bar 36 fixed to the glide plate assembly 21.

Figure 4:
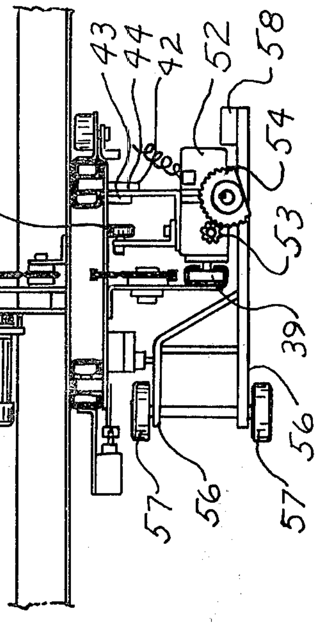
FIG. 4 is an end view of the handler apparatus taken in the direction indicated by the line 4—4 in FIG. 3.

Along the lower longitudinal free edge of a plate 37 forming the stem area of the T-section of the glide plate assembly 21 is a rail 38 of C cross section. This rail 38 runs the length of the glide plate assembly 21. The carriage assembly 23 is slidably supported on the rail or track 38 through a slide block 39 which operates in this track. Movement of the carriage assembly 23 longitudinally of the glide plate assembly 21 is also guided by a pair of longitudinally spaced rollers 41 (one is seen in the view of FIG. 4, the other being disposed in alignment with it behind the plane of the drawing). The carriage assembly 23 is further supported for longitudinal sliding movement by a plate 42 which moves between a pair of bars 43, 44 horizontally spaced apart a distance slightly greater than the thickness of the plate 42. The rollers 41 bear against the underside of the drive plate 29. Travel of the carriage assembly 23 is limited at each end of the glide plate 21 by suitable stops 46.

An assembly forming the handler or operator arm 24 is pivotally supported on the carriage assembly 23 by means of a shaft 51. The arm assembly 24 is keyed to the shaft 51, which in turn is journaled in bearings mounted on the carriage 23. The shaft 51 extends in a direction parallel to the rails or tracks 22 so that the arm 24 rotates in a plane parallel to the plane of the car doors 17. The arm 24 is power driven in rotation by a reversible electric motor/gear box unit 52 having a gear 53 meshed with a gear sector 54 fixed to the shaft 51. The handler arm assembly 24, a weldment of flat metal bar stock in the illustrated embodiments, includes a pair of spaced fingers 56 each provided with a pusher wheel 57. A counterweight 58 on the opposite side of the shaft 51 from the fingers 56 reduces the power requirements of the drive unit 52. The drive unit 52, preferably, can be overriden by manually pivoting the arm between its retracted and extended positions during a power outage or a mechanical fault.

Figure 3:
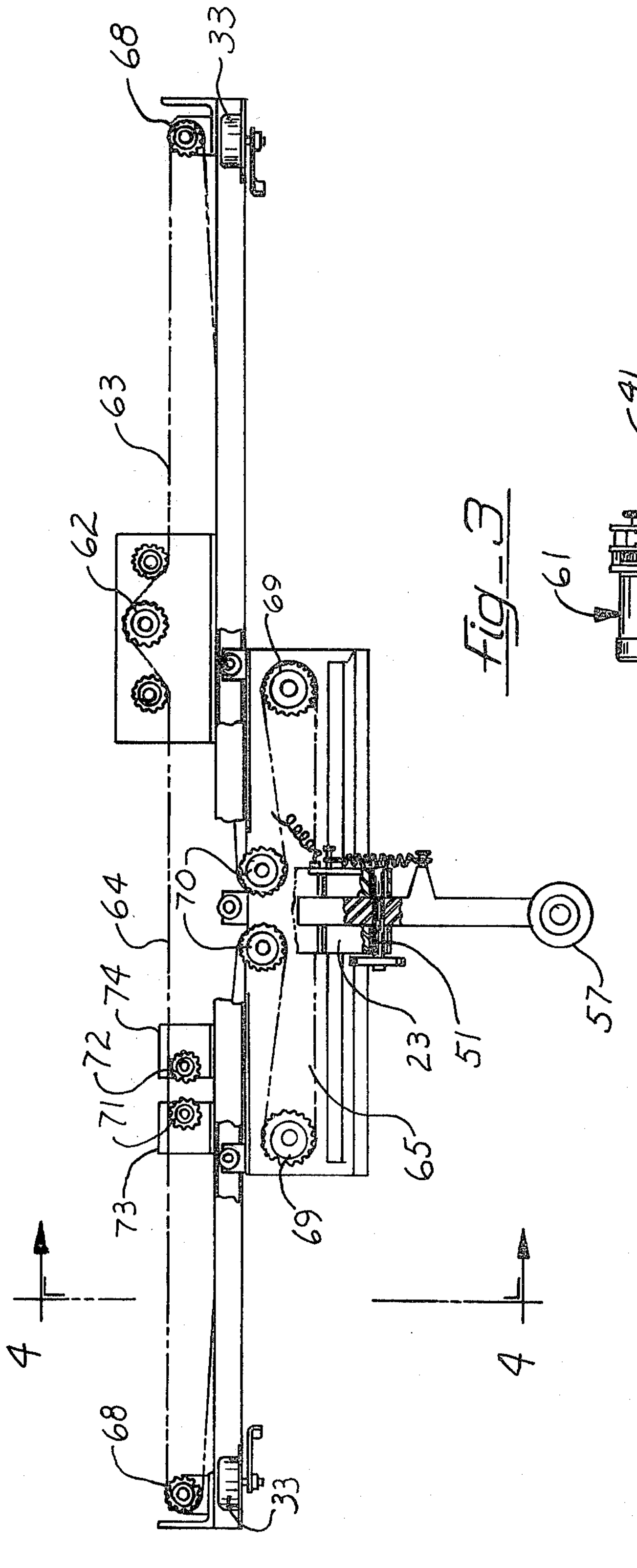
FIG. 3 is a somewhat schematic, side elevational view of the handler apparatus.

With particular reference to FIGS. 1*a*, 3 and 4, a reversible electric main drive motor 61 mounted on the elevator car above the top panel 32 is connected by a suitable V-belt drive to a chain drive sprocket 62. A mechanical transmission roller chain 63 is drivingly engaged with the sprocket 62 and is threaded through an endless or substantially endless path across the top of the elevator car 12. The path of the chain 63 includes a horizontal, primary loop 64 generally above or at the plane of the top panel 32 and a secondary loop 65 extending generally horizontally across the length of the guide plate 21.

The horizontal reaches of the primary chain loop 64 extend between a pair of idler sprockets 68 rotatably fixed adjacent opposite ends of the car 12. In a like manner, the horizontal reaches of the secondary chain loop 65 on the glide plate 21 extend between a pair of idler sprockets 69 rotatably fixed near ends of the glide plate 21. The primary and secondary horizontal chain loops 64, 65 merge where the chain 63 passes over another pair of idler sprockets 70 rotatably fixed on the glide plate 21 adjacent its midlength. The lower reach of the secondary chain loop 65 is fixed to the handler arm carriage 23 through a suitable clamp, pin, or other securing means. The upper reach of the main chain loop 64 is trained over a pair of sprockets 71, 72 each mounted on the input shaft of an associated rotary monitor 73, 74, respectively, which senses displacement of the chain 63 from any selected reference point and, as will be understood shortly, the position of the handler arm 24, for purposes of automatic control. The car top panel 32 is interrupted in the zone between the rails 22 to provide for passage of the chain 63 during traverse of the glide plate 21.

Suitable electric controls, including the monitors 73, 74 and various electrical limit switches sense the extreme and center positions of the glide plate 21 and arm carriage 23 on their respective tracks, as well as the extreme totary positions of the arm 24. The control circuitry is also responsive to conventional automatic electrical controls used to operate the elevator hoist motor and elevator door and landing gate actuators. The automatic electric control for the apparatus 20 can be conveniently located in a remote elevator control room.

Figure 5A:
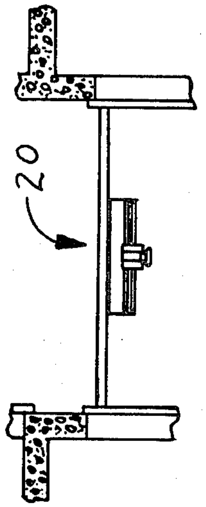
FIGS. 5*a* through 5*e* schematically illustrate motion sequences of the handler apparatus taken in off-loading a material unit to the left or to the right.
Figure 5B:
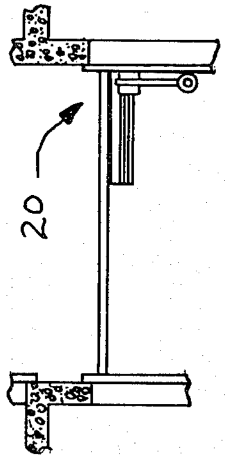
Figure 5C:
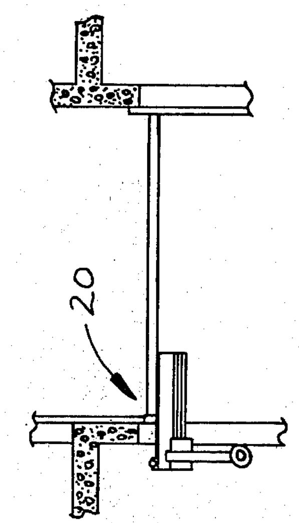
Figure 2:
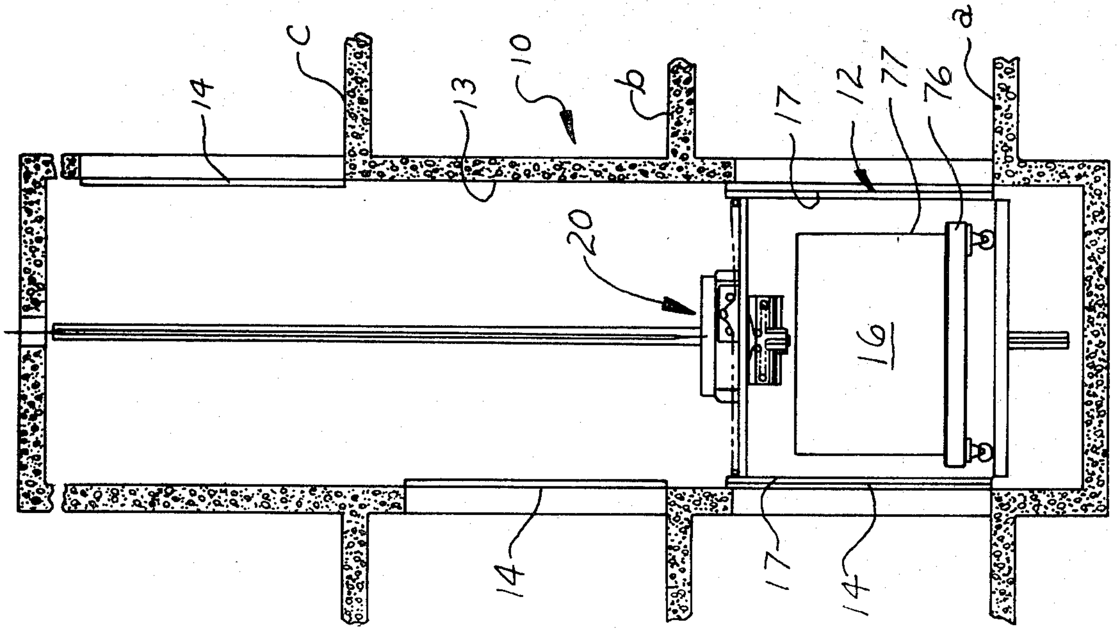
FIG. 2 is a schematic elevational, cross-sectional view of an elevator shaft in which the elevator car operates.

The apparatus 20 is effective to automatically unload a cart or other material unit from the elevator car 12. Depending on which end of the car 12 a cart is to be offloaded, the automatic controls direct a predetermined sequence of motion of the handler arm. FIGS. 2 and 5*a* illustrate the apparatus in an idling condition, where the glide plate 21 and carriage 23 are centered on their respective tracks, and the handler arm 24 is retracted into a horizontal position for maximum vertical clearance with the cart 16. The sequence of motion represented in FIGS. 5*b* and 5*c* is that taken by the apparatus 20 to off-load a cart through an elevator door and hatchway gate at the left, as viewed in the figures. From the idle position of FIG. 5*a*, the carriage 23 is caused to move fully to the right on the glide plate 21 and the glide plate 21 is caused to move to an intermediate rightward position. This intermediate rightward position is maintained by actuation of the associated rotary solenoid 33 and consequent movement of the related stop arm 34 into the path of the glide plate 21. The motive force for effecting displacement of the carriage 23 and glide plate 21 to their idle positions is applied by the main drive motor 61 through the chain 63. Since the chain 63 is anchored to the carriage 23, where it engages or passes the same, a tension force applied through one side of the chain develops translation of the carriage 23 to the corresponding side of the glide plate 21. Continued tension and movement in the chain 63 after the carriage 23 engages an associated stop 46 at one end of the glide plate 21 causes the glide plate to translate until it contacts the stop arm 34. The side of the chain 63 which is tensioned, and therefore the direction of movement of the glide plate 21 and the carriage 23, is determined by the direction of rotation of the motor drive unit 61 and associated drive sprocket 62.

Once the carriage 23 and glide plate 21 have reached the intermediate right-hand offset position of FIG. 5*b*, the gear motor unit 52 is energized to extend the arm 24 in a vertical plane from the horizontal retracted position to a depending vertical position. Bumpers 76 on both ends of the cart 16 or other suitable means on the cart or on the elevator car maintain the end faces of the cart sufficiently spaced from the elevator car gate 17 to provide clearance for extension of the arm 24 into this zone. When the desired level or landing is reached, the car door 17 and appropriate hatchway gate 14 are automatically raised to open positions and the drive motor 61 is energized in a reverse direction to shift the glide plate 21 and carriage 23 and arm 24 leftwardly by tension in the associated side of the chain 63. During such movement the arm 24, through the pusher rollers 57, engages an end face 77 of the cart unit 16 to "pick up" and cause the cart to roll off the elevator car 12. This leftward movement of the glide plate 21 is not restricted by actuation of the associated rotary solenoid 33 during offloading movement, so that the glide plate is caused to move to a point illustrated in FIGS. 5*c* and 1*b*, where nearly half of its length is cantilevered from the associated track 22. By the full extension of both the glide plate 21 and carriage 23, it is assured that the cart 16 will be ejected clear of the elevator car 12 and threshhold of the hatchway gate 14.

Figure 5D:
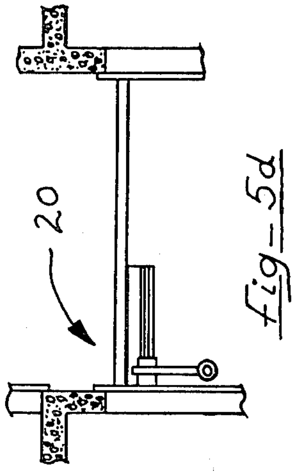
Figure 5E:
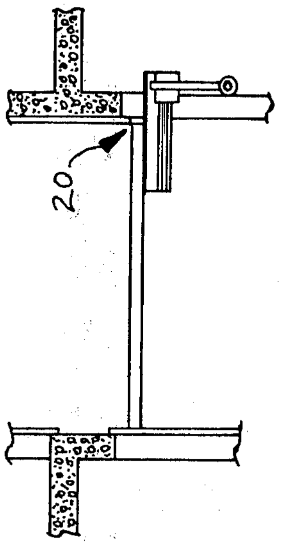

The sequence of motion depicted in FIGS. 5*d* and 5*e* is analogous to that in FIGS. 5*b* and 5*c*, but opposite in direction to off-load the cart 16 through a hatchway gate 14 to the right. Thus, the apparatus 20, by the motive force of the motor unit 61, is caused to be displaced from the idle position of FIG. 5*a* first to the left at FIG. 5*b* for "pick up" of a cart and then, with the arm 24 extended into contact with a leftward end face of the cart, to the right for ejection of the cart. The set of pusher rollers 57 engage the cart at horizontally spaced points and thereby reduce any tendenty of the cart to yaw.

From the foregoing, it will be seen that the disclosed cart handler apparatus 20 is particularly suited for application such as in hospitals, where cleanliness and sterility are of great importance, since the apparatus avoids operating elements and attendant hardware on the floor of the elevator car which would otherwise trap dirt and debris. The apparatus, moreover, is particularly adapted to be retrofitted to existing material handling elevator cars, since it requires a minimum of structural alterations to the car and, in many cases, no modification of existing carts. Further, it will be understood that features of the invention are applicable to handler systems which load as well as unload cart units.

What is claimed is:

1. In a material lift elevator system having an elevator car operating in a vertical shaft between vertically spaced landings, said car having a floor for supporting a material unit and at least one opening for loading and off-loading the material unit to and from the car, means for automatically moving a material unit in a horizontal path between a lift position on the floor of the car and a wait position on the landing, said moving means including an arm adapted to engage a generally vertical end face of the material unit and displace said material unit through said path by forces applied to said end face, said moving means being suspended on the car in a zone above the path of said material unit, means supporting said arm for extension and retraction movement from said zone downwardly into said path and upwardly to said zone, said supporting means including means for causing extension and retraction movement of said arm in a substantially vertical plane.

2. A material lift elevator system as set forth in claim 1, wherein said extension and retraction means includes means for pivoting said arm about a substantially horizontal axis perpendicular to the plane of said car opening.

3. A material lift elevator system as set forth in claim 1, wherein said apparatus includes traversing means supporting said arm for movement in a generally horizontal plane to first engage said material unit and thereafter forcibly displace said material unit along said path

4. A material lift elevator system as set forth in claim 3, including reversible means to move said arm horizontally between opposite ends of said car.

5. A material lift elevator system as set forth in claim 4, wherein said car has a material unit receiving and discharging opening at opposite ends, said traversing means being adapted to idle at a point generally midway between the planes of said opposite openings.

6. A material lift elevator system as set forth in claim 3, including power means carried on said traversing means to extend and retract said arm.

7. A material lift elevator system as set forth in claim 6, including balancing means to counteract the weight of said arm, whereby the load on said power means is reduced.

8. In a material lift elevator system having an elevator car operating in a vertical shaft between vertically spaced landings, said car having a floor for supporting a material unit and at least one opening for loading and off-loading the material unit to and from the car, means for automatically moving a material unit in a horizontal path between a lift position on the floor of the car and a wait position on the landing, said moving means including an arm adapted to engage a generally vertical end face of the material unit and displace said material unit through said path by forces applied to said end face, said moving means being suspended on the car in a zone above the path of said material unit, traversing means supporting said arm for movement in a generally horizontal plane to first engage said material unit and thereafter forcibly displace said material unit along said path, power means carried on said traversing means to extend and retract said arm, balancing means to counteract the weight of said arm, whereby the load on said power means is reduced, said arm being arranged to eject a material unit by pushing on said end face, said arm including a pair of laterally spaced contact elements to reduce any tendency of said material unit to yaw.

9. In a material lift elevator system having an elevator car operating in a vertical shaft between vertically spaced landings, said car having a floor for supporting a material unit and at least one opening for loading and off-loading the material unit to and from the car, means for automatically moving a material unit in a horizontal path between a lift position on the floor of the car and a wait position on the landing, said moving means including an arm adapted to engage a generally vertical end face of the material unit and displace said material unit through said path by forces applied to said end face, said moving means being suspended on the car in a zone above the path of said material unit, traversing means supporting said arm for movement in a generally horizontal plane to first engage said material unit and thereafter forcibly displace said material unit along said path said traversing means including a carriage slidably mounted on a glide plate element, said carriage supporting said arm, said glide plate element being slidably disposed on a track fixed on said elevator car, said glide plate and track being constructed and arranged to permit said glide plate element to be cantilevered from said track through said opening for a substantial portion of its length, said carriage being arranged to be substantially fully supported on said cantilevered portion.

10. In a material lift elevator system having an elevator car operating in a vertical shaft between vertically spaced landings, said car having a floor for supporting a material unit on at least one open end for loading and off-loading a material unit to and from the car through said opening, handling means for forcibly displacing a material unit along a path over the elevator floor and a landing between a lift position on the car floor and a wait position on a landing clear of the elevator car, said handler means including an arm, power means for displacing said arm between an extended, generally vertical position depending into said path, and a retracted position above said path, means to convey said arm between one end of said car to the opposite end, said arm including support means cooperating with said power means to restrict movement between the extended and retracted positions to a vertical plane, said conveying means being constructed and arranged to support said arm adjacent one end of said car whereby said arm is adapted to be moved during extension or retraction in a space between said one car end and an adjacent end face of said material unit, said arm being engageable with said adjacent material unit end face, said conveying means being arranged to forcibly displace said material unit along said path while exerting force through said arm on said material unit through the zone of engagement between said arm and said adjacent material end face.

11. A material lift elevator system as set forth in claim 10, including arm support means cooperating with said power means for and limiting extension and retraction movement of said arm to pivotal movement in a vertical plane parallel to said one end of said car.

12. A material lift elevator system as set forth in claim 11, wherein said conveying means includes means to provisionally support said arm through said end opening substantially beyond said shaft.

13. In a material lift elevator system having an elevator car operated in a vertical shaft between vertically spaced landings, said car having a floor for supporting the material unit and openings at its opposite ends for loading and off-loading the material unit to and from the car through said openings, automatic handler means for forcibly displacing a material unit along a path over the elevator floor and a landing between a lift position on the car floor to a wait position on a landing clear of the elevator car, said handler means including a track supported on the top of the car above the path of the material unit and extending in a direction parallel to said path, a carriage slidable on said track above said path, an arm carried by said carriage, said arm being pivotally mounted on said carriage for extension and retraction in a plane transverse to said path, actuator means to pivot said arm between a generally horizontal retracted position above said path and a generally vertical, depending, extended position reaching into said path, reversible drive means for moving said carriage from an idle position with the arm generally centered to either end of said car, said carriage having means associated with said track to permit said arm to extend outwardly of said car through either of said car openings to reach a car in a wait position on a landing.

* * * * *